United States Patent [19]

Armitage

[11] 4,155,280

[45] May 22, 1979

[54] MACHINE TOOL APPARATUS

[76] Inventor: Harry J. Armitage, 1546 Cavitt Rd., Monroeville, Pa. 15146

[21] Appl. No.: 690,546

[22] Filed: May 27, 1976

[51] Int. Cl.² .......................... B23B 3/10; B23B 3/20
[52] U.S. Cl. ....................................... 82/2 D; 82/2 B
[58] Field of Search .................. 82/2 D, 2 B, 1.2, 1.4

[56] References Cited

U.S. PATENT DOCUMENTS

| 873,787 | 12/1907 | Riddell | 82/2 D |
|---|---|---|---|
| 3,158,065 | 11/1964 | Koronek et al. | 90/12 |
| 3,552,242 | 1/1971 | Morgan et al. | 74/826 |
| 3,656,377 | 4/1972 | Kosem | 82/1 C |
| 3,662,442 | 5/1972 | Noa | 82/2 D |
| 3,813,745 | 6/1974 | Kuck et al. | 82/2 B X |

Primary Examiner—Leonidas Vlachos
Attorney, Agent, or Firm—Hymen Diamond

[57] ABSTRACT

Apparatus for forming complex shapes in work of large dimensions, including a turn table on which a support for a tool mount is mounted slideable in a horizontal slide. The tool mount has a turret which may be circular or polyganol or any other suitable shape with tools extending from its periphery. The tool mount is mounted in the tool-mount support slideable in a vertical slide. Drives are provided for rotating the turn table, for changing the position of the tool-mount support horizontally along the horizontal slide, for changing the position of the tool mount vertically along the vertical slide and for rotating the turret. The selection and positioning of the tool may thus be predetermined. The work is mounted on a fixture over the turn table so that any selected ones of the tools extending from the turret can be positioned in cutting engagement with the work. The drives are controlled or programmed in accordance with a predetermined program preset in a numerical control unit or by a tracer following a template to form the complex shapes.

3 Claims, 9 Drawing Figures

MACHINE TOOL APPARATUS

BACKGROUND OF THE INVENTION

This invention relates to machine-tool apparatus and has particular relationship to such apparatus for forming complex shapes in work by continuous-path cutting of the work. Typical of the work with which this invention is used to shape, referred to here in the interest of being concrete, is the turret ring on a military tank. In accordance with the teachings of the prior art, the turret ring is shaped manually by two machinists on a turn table which is essentially the chuck of a vertical lathe. The turret ring is mounted over the turn table. The turn table has a plurality of slides on which tools are mounted operable by the machinists to carry out the shaping. This operation is costly, but a more perplexing difficulty which has been experienced in this prior-art practice is that the machinists become dizzy by the rotation of the turn-table and fall off the table at times seriously injuring themselves.

Korenek U.S. Pat. No. 3,158,065 (FIG. 5) discloses apparatus for machining the inner surface of a semispherical lid in which a tool on a swiveling member on a frame moves along a track having the contour of a circular arc producing the semispherical machined surface. Korenek does not lend itself to the formation of complex shapes.

It is an object of this invention to overcome the above-described difficulties and disadvantages of the prior art and to provide apparatus for forming complex shapes in work by continuous-path cutting which apparatus shall not require personnel on a rotating table for performing cutting operations.

SUMMARY OF THE INVENTION

In accordance with this invention a tool or tools are mounted in a tool mount which is slideable in a slide in a tool-mount support. The tool-mount support is mounted slideably in a slide generally at right angles to the tool-mount slide. The tool-mount support and its slide are mounted on a turn table rotatable therewith. The work is mounted on a fixture over the table in a position such that a selected tool may be set in cutting engagement therewith.

Typically, as disclosed herein and as recited in the claims, the tool-mount support is slideable horizontally and the tool-mount is slideable vertically. It is within the scope of this invention to mount the tool-mount support slideable vertically and the tool mount slideable horizontally. The reference in the claims to horizontally slideable tool-mount support and vertically slideable tool mount are included in the interest of rendering the claims readily readable by avoiding prolix and complex wording and are to be read as including within their scope vertical mounting of the tool-mount support and horizontal mounting of the tool-mount.

Drives are provided for changing the position of the tool-mount support along the horizontal slide and of the tool mount along the vertical support and for selecting a tool mounted in the tool mount for cutting engagement with the work. There is a control connected to the drives for programming the selection of the tools and the positions of each selected tool in engagement with the work. The control includes means for feeding back intelligence from the drives signalling the selection of the tools and the respective positions of each selected tool. Such a control may include a numerical control unit programmed to produce the desired shaping or a tracer following a template.

BRIEF DESCRIPTION OF THE DRAWINGS

For a better understanding of this invention, both as to its organization and as to its method of operation, together with additional objects and advantages thereof, reference is made to the following description taken in connection with the accompanying drawings in which.

DETAILED DESCRIPTION OF EMBODIMENT

Figure 2:
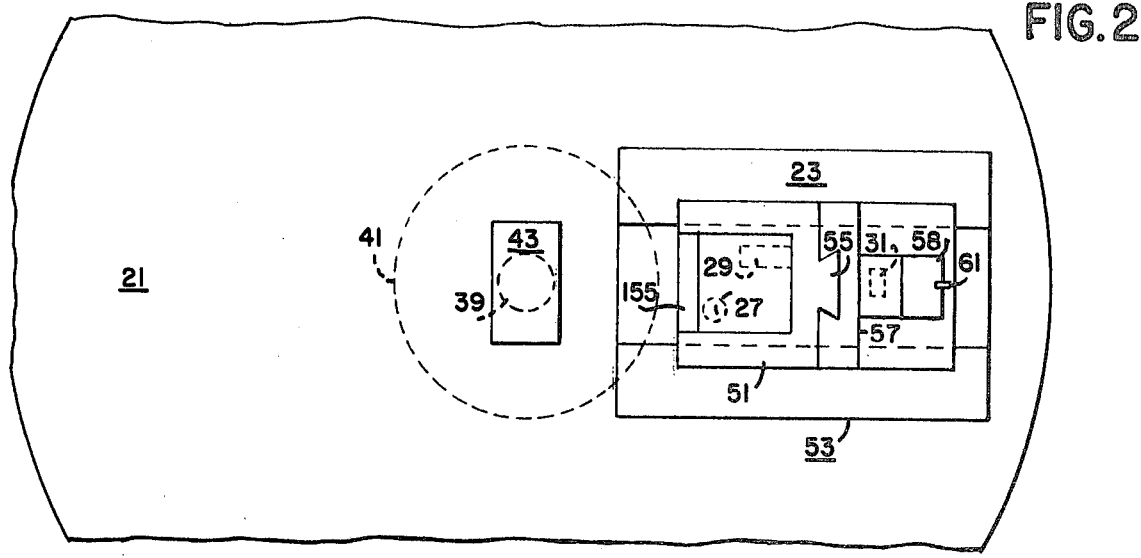
FIG. 2 is a fragmental plan view of the embodiment shown in FIG. 1.
Figure 1:
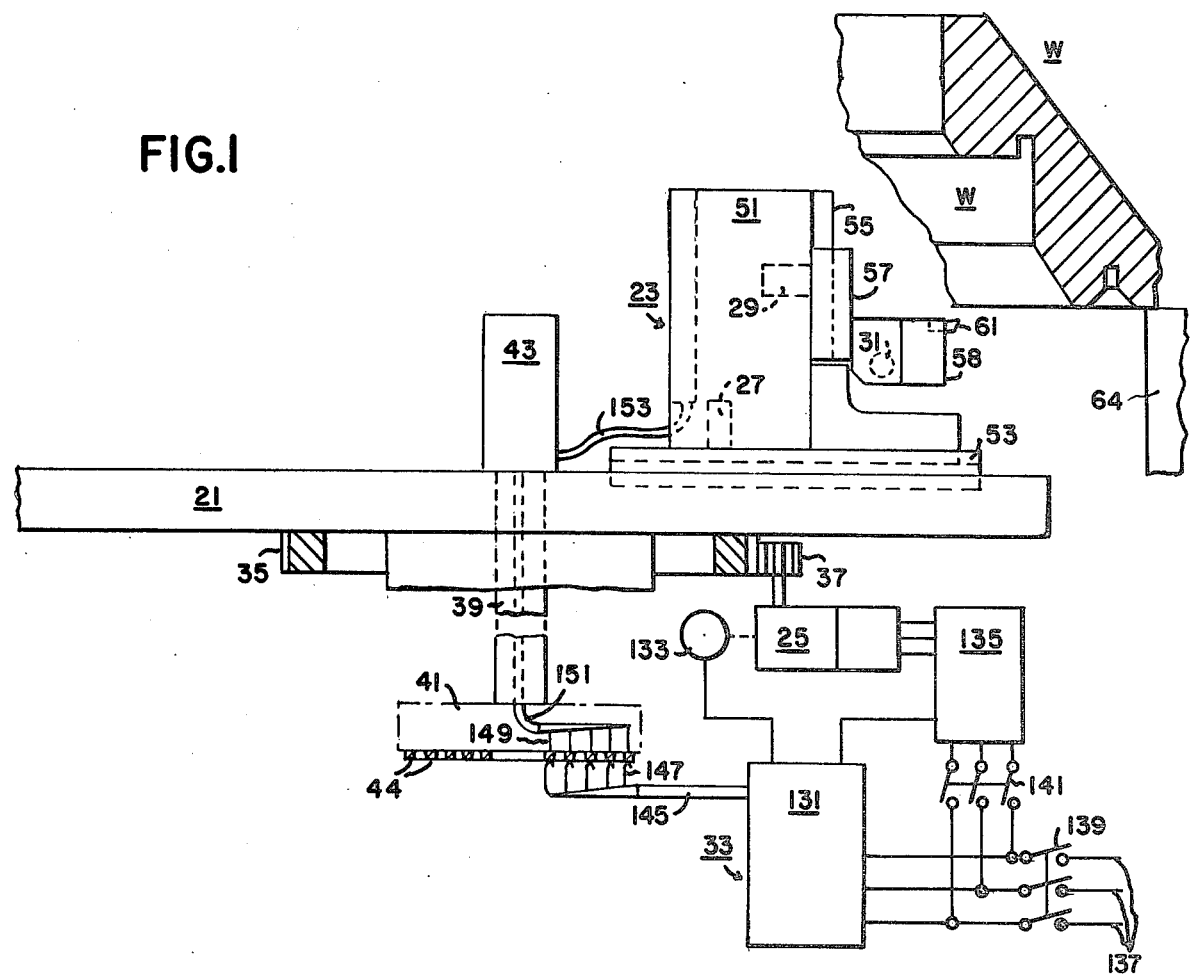
FIG. 1 is a view in side elevation, partly diagrammatic, of an embodiment of this invention.

The apparatus shown in the drawings includes a turn table 21, a tool unit 23, drives 25, 27, 29 and 31 for the turn table and the components of the tool unit and a control 33 for these drives.

The turn table includes a gear 35 which is driven from the drive 25 through a pinion 37. The drive 25 typically includes a motor of adequate power whose drive shaft (not shown) is connected to pinion 37 through an appropriate speed reducer. The turn table 21 also includes a central hollow tube or conduit 39 which terminates in a slip-ring unit 41 below and a terminal box 43 above. The slip-ring unit 41 is a hollow cylinder bounded by a slip-ring 44 at its lower end. The conduit 39, slip-ring unit 41 and terminal box 43 are rotatable with the table 21.

Figure 7:
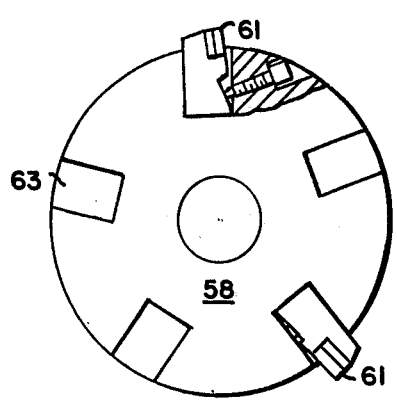
FIG. 7 is a plan view of the turret of the tool mount.

The tool unit 23 includes a support 51 for the tool mount which is slideable horizontally in a slide 53. The tool-mount support 51 is moveable, radially of the table 21 inwardly or outwardly, along the slide 53 by horizontal drive 27. The tool-mount support has vertical slide 55 in the form of a dove tail. A tool-mount 57 from which a turret 58 extends is slideable vertically along vertical slide 55. The tool mount is moveable upwardly or downwardly along slide 55 by drive 29. The turret 58 (FIG. 7) has a plurality of tools 61 secured in slots 63 around its periphery. The work W extends over the turn table 21 on a fixture 64 in a position such that it can be engaged in cutting relationship by selected tools of the tool-mount. The tool mount 57 is driven or rotated by drive 31 so that selected ones of its tools 61 can be brought into cutting engagement with the work W.

Figure 4:
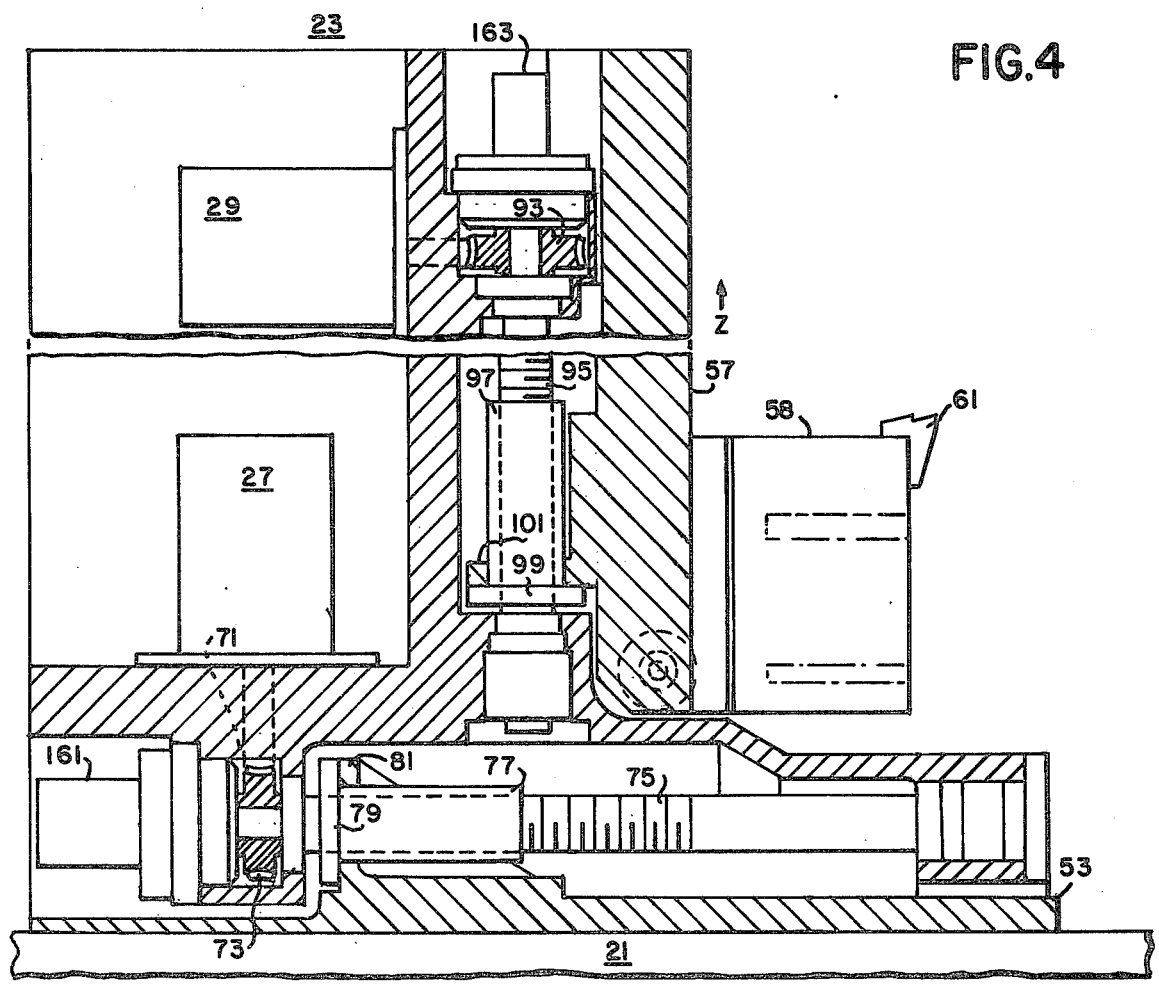
FIG. 4 is a view partly in side elevation and partly in longitudinal section of the unit shown in FIG. 3.

The tool-mount support 51 is moved horizontally along track 53 by drive 27 (FIG. 4) through worm 71, worm wheel 73 and screw 75. The screw 75 turns in a ball nut 77 whose flange 79 engages a projection 81 on slide 53. The ball nut 77 is held fixed by the slide 53 as the screw 75 rotates. As this screw rotates it moves horizontally through the ball nut 77 advancing the tool-mount support 51. In FIG. 4 the tool-mount support 51 is shown in the extreme right-hand position.

Figure 3:
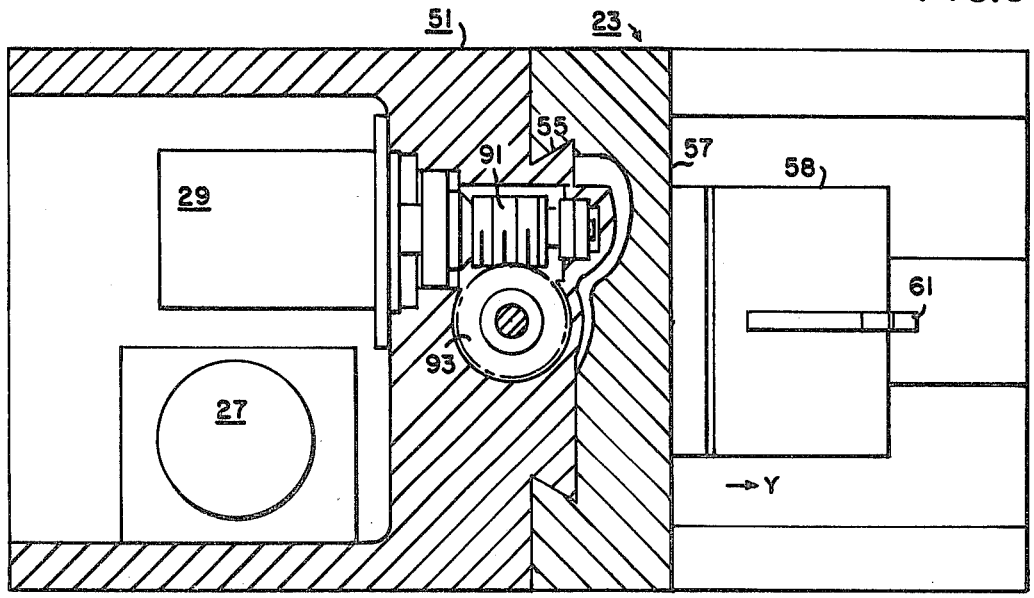
FIG. 3 is a plan view partly in transverse section showing the unit including the tool-mount support and the tool mount of the embodiment shown in FIG. 1.

The tool mount 57 is moved vertically on slide 55 by drive 29 through worm 91, worm wheel 93 and screw 95 (FIGS. 3, 4). There is a ball nut 97 on screw 95 whose flange 99 engages projection 101 from tool mount 57. As screw 95 roates the ball nut 97 moves along screw 95 advancing tool mount 57 and turret 58 through projection 101. In FIG. 4 the tool mount 57 is shown in its lowermost position.

Figure 5:
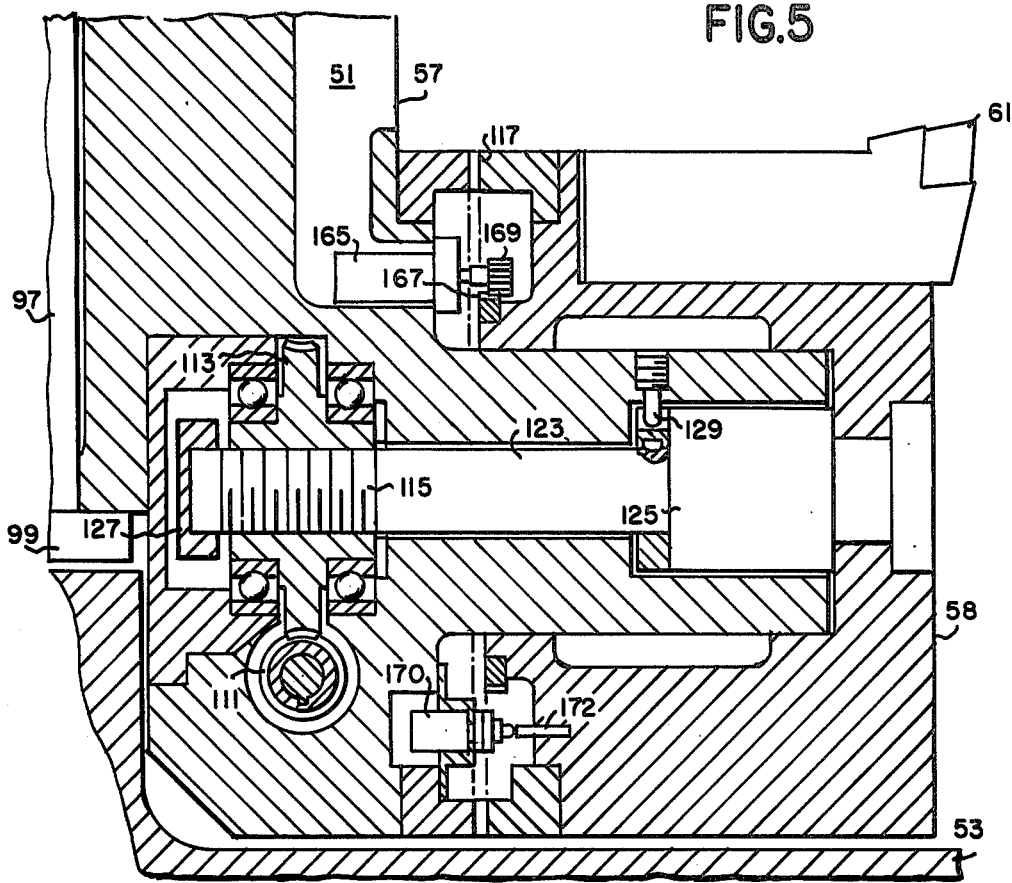
FIG. 5 is a view in section showing the drive for the selection of tools of the tool mount in the locked position.
Figure 6:
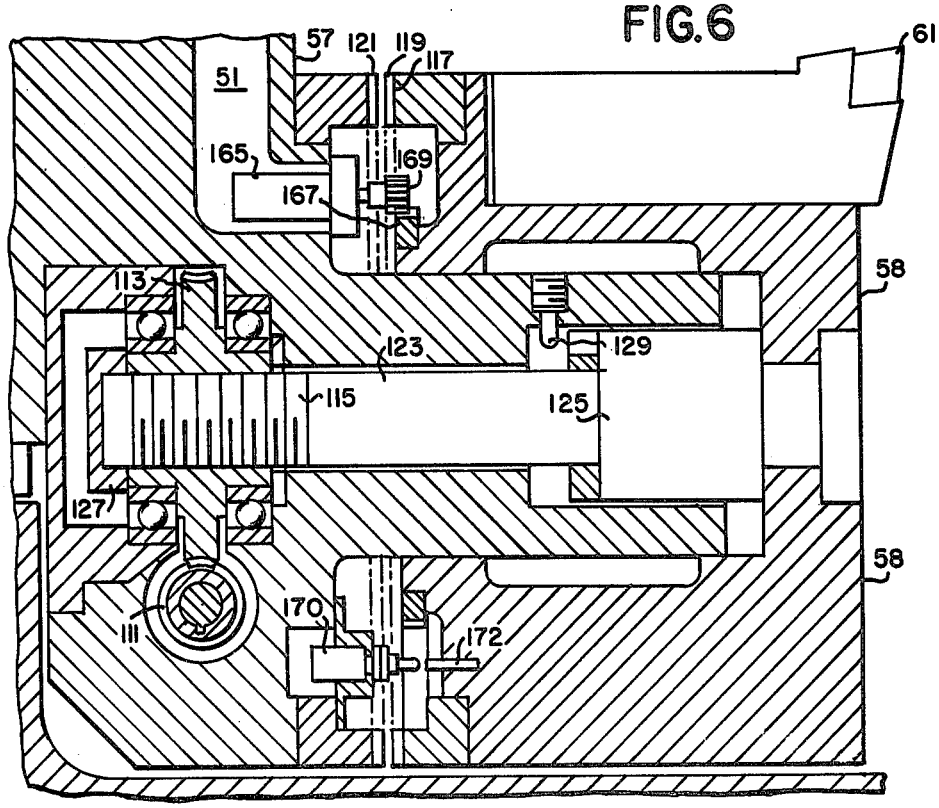
FIG. 6 is a view similar to FIG. 5 but with the drive in the unlocked position.
Figure 8:
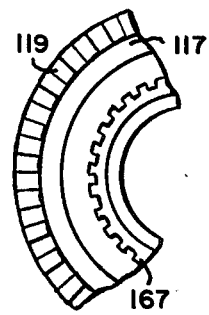
FIG. 8 is a plan view of a component of the locking mechanism for the tool-selector drive.

The tools 61 on turret 58 are selectably positioned in cutting engagement with the work W by rotating turret 58. The turret 58 is rotated from motor 31 through worm 111, worm wheel 113, and screw 115 (FIGS. 5, 6). The inner side 117 of the turret 58 has teeth 119 (FIG. 8) which mesh with teeth 121 in the outer face of the portion of the tool mount 57 adjacent the turret 58. The shaft 123 of the screw 115 has a cylinder 125 whose bases abut surfaces of the turret 58. At its end opposite the cylinder 125 the screw 115 carries a cap 127.

FIG. 5 shows the tool-mount 57 in the locked position and FIG. 6 shows the tool-mount in the unlocked position. In the locked position teeth 119 and 121 are engaged. To unlock the tool-mount 57 the motor 31 is energized causing threaded worm-wheel or nut 113 to rotate. The screw 115 is advanced to the right with reference to FIGS. 5 and 6 advancing turret 58 to the right and at the same time advancing cap 127 to the right. The advance of turret 58 disengages the teeth 119 and 121 unlocking the turret 58. Cap 127 is advanced until its outer face (right face) abuts the inner face of the worm wheel or 113 (FIG. 6). Shaft 123 then no longer advances but is rotated and causes the turret 58 to rotate. The turret 58 may be rotated until a selected tool 61 is in position to engage the work W. The motor 31 is then reversed rotating the worm wheel 113 and retracting shaft 123 in the opposite direction and locking the tool-mount in the new position. Pin 129 prevents rotation of the turret 58 when the motor 31 is reversed.

The control for the drives 25, 27, 29 and 31 includes numerical control unit 131 which programs the operation of these drives. The turn-table drive 25 has a tachometer 133 which provides a signal indicating the speed of the drive. The output of the tachometer 133 is supplied (fed back) to the numerical control unit 131 which in turn impresses command signals on a control unit 135 for the turntable drive 25. The apparatus is powered from a commercial supply 137 which is connected to the numerical control unit 131, and to the control unit 135 through conventional circuit breakers, 139 and 141. Programming command signals from the numerical control unit 131 and power are supplied to the drives 27, 29, 31 through a cable 145. The conductors 147 of this cable 145 are connected through slip rings 44, which rotate with the turn table 21, to the conductors 149 of another cable 151 which passes through conduit 39. The conductors 149 of the latter cable are at the lower end connected to the slip rings 44 and rotate with the turn table. At the upper end these conductors are connected to the terminals of terminal box 43 which rotates with the turn table 21. The terminals of box 43 are connected through conductors (not shown) in a flexible cable 153 to a terminal strip 155 in the tool-mount support 51. The flexibility of cable 153 permits radial movement of the tool-mount support 51 relative to the terminal box 43. Feed-back from drives 27, 29, 31 are also supplied to the numerical control unit through cables 145, 151 and 153.

The feed-back is derived through conductors (not shown from a resolver and tachometer 161 driven from the horizontal screw 75, a resolver and tachometer 163 driven from the vertical screw 95 and a resolver and tachometer 165 driven from a ring gear 167, extending radially inwardly (FIG. 8) from the teeth 119 on the inner end 117 of the turret 58, through the pinion 169. The resolvers and tachometers 161, 163 and 165 feedback speed and position intelligence to the numerical control unit 131 effectuating the carrying out of the commands of the unit 131. Limit switch 170 (FIG. 5) is actuated by pin 172 only when the turret 58 is in the proper position for operation and locked by engagement of the teeth 119 and 121. If this limit switch 170 is not actuated by engagement with pin 172, the operation of the apparatus is prevented.

Figure 9:
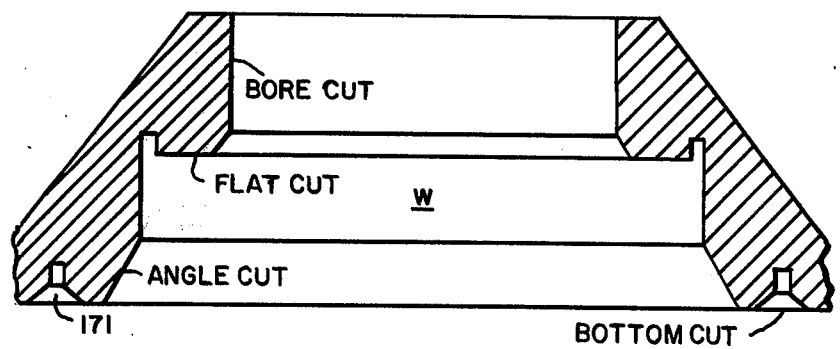
FIG. 9 is a fragmental view showing the work as it is shaped in accordance with this invention and the manner in which this work is shaped.

FIG. 9 shows a fragment of the work W (typically a turret ring) and indicates the manner in which the work is shaped. The cuts taken as commanded by the numerical control unit 131, as indicated in FIG. 9 are a cut facing the lower run, a bottom cut producing the groove 171, a bore cut, a flat cut generally paralled to the lower run. These cuts are produced by different tools 61 in the turret 58 set into cutting position as commanded by the numerical control 131.

While an embodiment of this invention has been disclosed herein, many modifications thereof are feasible. This invention is not to be restricted except insofar as is necessitated by the spirit of the prior art.

I claim:

1. Apparatus for forming complex shapes in work by continuous path cuts comprising a turn-table, means connected to said turn-table for rotating said turn-table, a horizontal track on said turn-table, a support slideable in said horizontal track, a vertical track in said support, drive means connected to said support to drive said support horizontally along said horizontal track, a tool mount slideable along said vertical track, drive means, connected to said tool mount, for driving said tool mount vertically along said vertical track, a plurality of tools to be mounted in said tool mount, said work being mounted stationary over said turn-table with said tools in position to be set in cutting engagement with said work, drive means, connected to said tool mount for selectively setting said tools in cutting engagement with said work, and control means for controlling said horizontal-drive means and said tool-setting drive means and said vertical-drive means coordinated in accordance with a predetermined program to bring said tools into cutting engagement with said work selectively and to change the position of said tools, in their cutting engagement with said work, progressively as the cutting takes place, to form said complex shapes in said work, said control means including means for feeding back intelligence separately from said horizontal-drive means and said vertical-drive means and said tool-setting drive means progressively signalling the positions, horizontally and vertically, of said tools, to enable said control means to set said tools in accordance with said program.

2. Apparatus for forming complex shapes in work by continuous path cuts comprising a turn-table, means connected to said turn-table for rotating said turn-table, a horizontal track on said turn-table, a support slideable in said horizontal track, a vertical track in said support, drive means connected to said support to drive said support horizontally along said horizontal track, a tool mount slideable along said vertical track, drive means, connected to said tool mount, for driving said tool mount vertically along said vertical track, a plurality of tools to be mounted in said tool mount, said work being mounted stationary over said turn-table with said tools in position to be set in cutting engagement with said work, drive means, connected to said tool mount for selectively setting said tools in cutting engagement with said work, and control means for controlling said horizontal-drive means and said tool-setting drive means and said vertical-drive means coordinated in accordance with a predetermined program to bring said tools into cutting engagement with said work selectively and to change the position of said tools, in their cutting engagement with said work, progressively as the cutting takes place, to form said complex shapes in said work, said control means including numerical-control means for impressing coordinated drive commands in accordance with said predetermined program on said horizontal-drive means and on said vertical-drive means and on said tool-setting-drive means respectively to control the movement of said horizontal-drive means and said vertical-drive means and to program the selective engagement of said tools with said work and the positioning of said tools in cutting engagement with said work, said control means also including means for feeding back intelligence separately from said horizontal-drive means and said vertical-drive means and said tool-setting-drive means to said numerical-control means, progressively signalling the positions, horizontally and vertically, of said tools, to enable said control means to set said tools in accordance with said program.

3. Apparatus for forming complex shapes in work by continuous path cuts comprising a turn-table, means connected to said turn-table for rotating said turn-table, a horizontal track on said turn-table, a support slideable in said horizontal track, a vertical track in said support, drive means connected to said support to drive said support horizontally along said horizontal track, a tool mount slideable along said vertical track, drive means, connected to said tool mount, for driving said tool mount vertically along said vertical track, a plurality of tools to be mounted in said tool mount, said work being mounted stationary over said turntable with said tools in position to be set in cutting engagement with said work, drive means, connected to said tool mount for selectively setting said tools in cutting engagement with said work, and control means for controlling said horizontal-drive means and said tool-setting drive means and said vertical-drive means coordinated in accordance with a predetermined program to bring said tools into cutting engagement with said work selectively and to change the position of said tools, in their cutting engagement with said work, progressively as the cutting takes place, to form said complex shapes in said work, a resolver and tachometer being connected each to said horizontal-drive means, to said vertical-drive means and to said tool-setting-drive means, each said resolver and tachometer being connected to said control means to feed back speed and position intelligence of its respective drive means to said control means.

* * * * *